(12) United States Patent
Liu

(10) Patent No.: US 12,084,848 B2
(45) Date of Patent: Sep. 10, 2024

(54) FLOOR DRAIN

(71) Applicant: DALIAN FORESIGHT TECHNOLOGY CO., LTD., Dalian (CN)

(72) Inventor: Yujian Liu, Dalian (CN)

(73) Assignee: DALIAN FORESIGHT TECHNOLOGY CO., LTD., Dalian (CN)

( * ) Notice: Subject to any disclaimer, the term of this patent is extended or adjusted under 35 U.S.C. 154(b) by 557 days.

(21) Appl. No.: 17/394,379

(22) Filed: Aug. 4, 2021

(65) Prior Publication Data

US 2021/0363743 A1 Nov. 25, 2021

Related U.S. Application Data

(63) Continuation of application No. PCT/CN2020/074994, filed on Feb. 13, 2020.

(51) Int. Cl.
*E03F 5/04* (2006.01)
(52) U.S. Cl.
CPC ............ *E03F 5/0407* (2013.01); *E03F 5/041* (2013.01)
(58) Field of Classification Search
CPC . E03F 5/0407; E03F 5/041; E03F 2005/0417; E03C 1/281; E03C 1/292; E03C 1/298
See application file for complete search history.

(56) References Cited

U.S. PATENT DOCUMENTS

| | | | |
|---|---|---|---|
| 10,683,654 B2 | 6/2020 | Priester | |
| 2011/0203979 A1 | 8/2011 | Schlueter | |
| 2017/0198982 A1 | 7/2017 | Törnquist et al. | |

FOREIGN PATENT DOCUMENTS

| | | | | |
|---|---|---|---|---|
| CN | 102535633 A | 7/2012 | | |
| CN | 105986618 A | 10/2016 | | |
| CN | 108018937 A | * 5/2018 | ............ | E03F 5/0407 |
| CN | 208056260 U | 11/2018 | | |
| CN | 109183958 A | 1/2019 | | |
| IN | 108018937 A | 5/2018 | | |
| KR | 20110111996 A | 10/2011 | | |

OTHER PUBLICATIONS

English Translation of CN-108018937-A from PE2E search database. (Year: 2018).*
Internation Search Report of PCT/CN2020/074994, Mailed May 15, 2020.

* cited by examiner

Primary Examiner — Terry K Cecil

(57) ABSTRACT

A central position of a water storage tank is provided with a drain opening; a water return bowl is in a short box shape, and is made of silicone; the bottom end of a skirt of the water return bowl is in direct contact with a bottom plane of the water storage tank to form a closed surface; a top plane of the water return bowl can attach to a grate, and the skirt of the water return bowl can be folded inwardly to form a curved flaky structure under drainage pressure; drain holes of the grate are provided on the edge of the water storage tank. Supports for supporting the grate are provided in the water storage tank. A gas buffer device is provided on the top surface of the flat-top water return bowl.

4 Claims, 2 Drawing Sheets

FLOOR DRAIN

CROSS REFERENCE TO RELATED APPLICATIONS

The present application is a continuation-application of the International (PCT) Patent Application No. PCT/CN2020/074994, filed on Feb. 13, 2020, which claims the foreign priority to the Chinese patent application No. 201910118930.X filed on Feb. 18, 2019 in China National Intellectual Property Administration, and the entire contents of which are hereby incorporated by reference in its entirety.

TECHNICAL FIELD

The present disclosure relates to a floor drain for indoor floor drainage.

BACKGROUND

The water seal floor drain is a structure with a storage tank and a bell (having a spherical top surface) type return bowl to close a channel. Water may be drained by flowing up and down for 180 degrees to flow over the return bowl. A disadvantage of such the structure may include: a size of the water seal floor drain must be high and large to ensure a width of a drainage channel and meet the national standard of 50 mm of water storage. Nowadays, for domestic decoration, a ground height may be limited, the floor drain in such the height may not be able to be configured. While draining water through the bell-type return bowl, water may enter from a center hole of a grate, and then flow from a top spherical surface of the bell-type return bowl returning to an inner surface of the bell-type return bowl. In this way, resistance for drainage may be great, a self-cleaning ability may be poor, clogging may be generated easily. Water stored in the storage tank may be easily sucked away by a negative pressure generated by a sewer, resulting in an ineffective water closure of the return bowl. Further, a floor drain cover may be collapsed easily by a positive pressure generated by the sewer, resulting in an ineffective water closure of the return bowl. The water stored in the storage tank may contact the indoor air and may be evaporated, so that advantages of using water for closure may turn into a disadvantage.

SUMMARY OF THE DISCLOSURE

To solve the above technical problem, the present disclosure provides a drainage channel with an opening gate that directly communicates with a sewer, and a water-sealed floor drain that is still effective for sealing even when the floor drain does not contain water.

A center of a storage tank 4 defines a water outlet 1. An upper end of a wall of the water outlet 1 extends out of a bottom plane of the storage tank 4, and a lower end of the wall of the water outlet 1 extends out of the storage tank 4 to serve as a pipe joint. A water return bowl 3 is box-shaped and made of silicone. A bottom end of a skirt of the water return bowl 3 directly contacts a closure surface of the bottom plane of the storage tank 4. A top plane of the water return bowl 3 may contact and fit with a grate 5. The skirt of the water return bowl 3 may be a sheet-like structure that is able to be folded and bent inwardly under a drainage pressure. Drainage holes 9 of the grate 5 are defined in an edge of the water storage tank 4.

In an embodiment, the bottom plane of the water storage tank 4 out of the skirt of the return bowl 3 may be configured to reach a position leveled with an upper surface of the wall of the water outlet 1, a water storage size of the water storage tank 4 may be reduced to a small-sized water storage tank 2. In this way, the bottom of the skirt of the water return bowl 3 may be understood as directly contacting with the closure surface of the bottom plane of the small water tank 2, an outer edge of the bottom end of the skirt of the return bowl 3 may contact an inner edge of the small water storage tank 2 to form another closure surface.

In the above two embodiments, a support post 10 may be configured in the water storage tank 4 to support the grate 5.

In the above two embodiments, an air bag 6 may be configured at an outer ring of the top surface of the flat-topped water return bowl 3, and an air bag 7 may be configured at a center of the top surface of the flat-topped water return bowl 3. A cross section of the flat-topped water return bowl having the air bags may be "W"-shaped, or the top of the water return bowl 3 may be in a shape of a film.

A skirt of the water return bowl made of silicone may be folded inwardly under the drainage pressure, solving the technical problem of the water being drained by flowing through the return bowl drainage up and down for 180 degrees. The drainage channel that is spaced apart into two sub-channels by the water return bowl is now configured as a wide drainage channel that is almost straight. An obstacle of the water return bowl may be removed. The floor drain in such the structure may be ideal, as blockage may be avoided, the self-cleaning ability may be improved, and a drainage speed may be improved.

The bottom edge of the silicone water return bowl directly contacts the inner bottom surface of the storage tank. In this way, a height left at the lower end of the water return bowl for serving as a drainage channel in the traditional water seal floor drain may not be required, and an integral height of the floor drain may be reduced. Firstly, a problem of the water seal floor drain being excessively high and unsuitable for domestic decoration may be solved. Secondly, in the case of no water contained in the storage tank, the water return bowl configured at the bottom of the storage tank may still isolate a channel between the sewer and the indoor room. Further, the closure effect may be structurally better than any modern mechanical valve, solving the problem of the water seal floor drain being ineffective in closure when water being absent.

The drainage holes may be defined on four edges of the grate. A total drainage cross-sectional area of the grate by defining the drainage holes in the four edges may be greater than a drainage cross-sectional area of the grate by defining a drainage hole at a center of the grate. Time when drained water entering the water storage tank by defining the drainage holes in the four edges may be earlier than time when drained water entering the water storage tank by defining the drainage hole in the center of the grate. The water may be drained in time. Without defining the drainage hole in the center of the grate, the hemispherical top surface of the traditional bell-type water return bowl may be cut off, such that the top surface may be a flat top surface, being the same as the bottom plane of the grate. Significance of such the structure may include: first, reducing the height of the water return bowl, further reducing the height of the water seal floor drain; second, changing the traditional water seal floor drain, in which the water needs to flow from the top surface of the return bowl to the inner surface of the return bowl to achieve the direct drainage.

By configuring the small-sized water storage tank, the water is completely contained in a space inside the water return bowl, and the space is not communicated with the outer environment, which may avoid the stored water from being evaporated, solving the problem of the water seal floor drain being 50 mm (national standard) in order to prevent the water from being evaporated. In this way, the water storage height may be reduced to further reduce an overall height of the floor drain.

A gas energy cushioning apparatus may be configured at the top surface of the silicone water return bowl having the flat top surface, such that each part of the silicone water return bowl has a function. Regardless of the "W"-shaped air energy cushioning apparatus or a film-type air energy cushioning apparatus, it solves the two long-term problems of the negative pressure of the water-sealed floor drain absorbing water and the positive pressure of the water-sealed floor drain collapsing the cover, at almost no cost at the same time. A top surface area of the short box type water return bowl having the flat top surface may be large, and the water return bowl may directly cover of an opening the sewer. Such the water return bowl may be sensitive and have enough space to absorb the energy. Secondly, the short box type silicone water return bowl as a whole may be elastic, and such the silicone box itself that covers the sewer may serve as a device that is able to expand and contract.

Configuring the post in the water storage tank reduces a span of the grate, expands the water storage tank to the edge, increases the capacity, and provides a preferred position for fixing and controlling the return bowl individually.

BRIEF DESCRIPTION OF THE DRAWINGS

The present disclosure will be described in further details by referring to the accompanying drawings.

DETAILED DESCRIPTION

Figure 1:
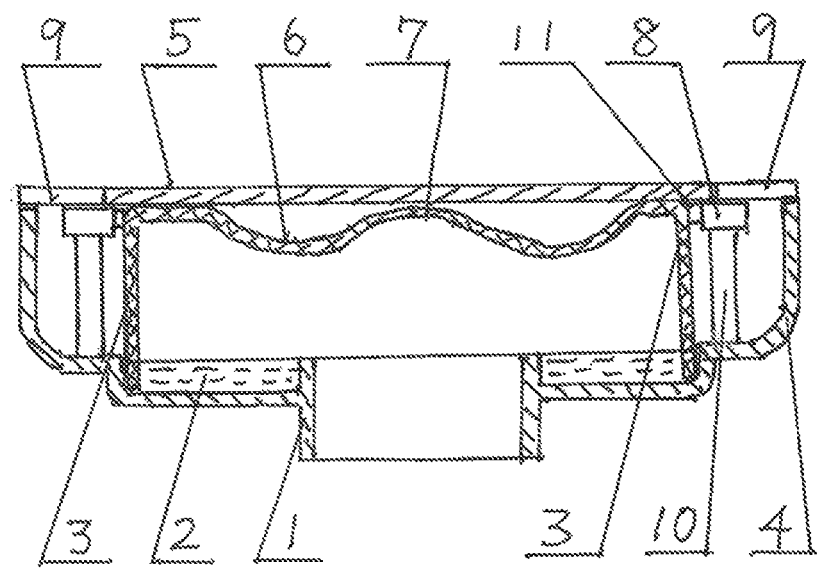
FIG. 1 is a schematic view of the present disclosure.

As shown in FIG. 1, a water outlet 1 may be defined in a center of the water storage tank 4, and a lower end of a wall of the water outlet 1 may be connected to a building sewer. A water return bowl 3 may be box-shaped, being significantly different from the bell-type water return bowl in the art that has a tall and spherical shaped top surface. The water return bowl in the present disclosure does not have a function for returning the water flow. For the short box type water return bowl 3, corners of a top flat surface of the water return bowl 3 may be configured as curved or squared table-like to expand a width of each drainage hole 9 defined in four edges of the grate 5. The water return bowl 3 may be made of silicone. A skirt (a height portion of the box) of the water return bowl 3 may be configured in a shape of a sheet extending downwardly, and may be bent and folded inwardly under a pressure of water. The top surface of the water return bowl 3 may be flat and may contact and fit with the bottom surface of the grate 5. The small-sized water tank 2 may be a part of the water storage tank 4. When the small-sized water tank 2 is formed, the bottom plane of the water storage tank 4 may be the bottom plane of the small-sized water tank 2. A bottom of the skirt of the water return bowl 3 may contact the bottom plane of the small-sized water tank 2 to form a closure surface. A shape of the inner edge of the small-sized water tank 2 may be the same as a shape of an outer edge of the skirt of the water return bowl 3. The small-sized water tank 2 and the skirt of the water return bowl 3 may be engaged with each other. That is, an outer diameter (outer side) of the bottom of the water return bowl 3 may contact an inner diameter (inner side) of the small-sized water tank 2 to form another closure surface. The small-sized water tank 2 may be formed by the bottom plane of the water storage tank 4 out of the skirt of the return bowl 3 being elevated, that is, the water storage tank 4 outside the skirt of the return bowl 3 may not store water any more. A height of the small-sized water tank 2 may be the same as a height of a top of the water outlet 1. Such the height determines the amount of water stored in the small-sized water tank 2.

When draining water, the water pressure generated by the water storage tank 4 causes the sheet-shaped water return bowl 3 to fold inwardly, forming a state of the water return bowl being absent. At this stage, a water draining path may be: water entering from elongated water drainage holes 9 defined in the four edges of the grate 5—the water storage tank 4—directly entering the upper entrance of the water outlet 1. The entire draining path does not have a bent portion, the water is drained along a straight path. This channel does not require a filtering apparatus. The water is drained by entering the elongated drainage holes 9 which are defined in the four edges of the grate 5 and each has a width of up to 10 mm, and directly entering the water outlet 1 having a standard diameter without any obstruction. The water drainage having such the structure is in an ideal state by having a large opening and being not blocked while draining debris.

The edge of the water return bowl 3 (outer diameter) may contact and fit with the edge of the inner diameter of the small-sized water tank 2 by elasticity of the edge of the water return bowl 3. The gravitational force causes the lower end of the water return bowl 3 to contact and fit with the bottom plane of the small-sized water tank 2. This is achieved by position returning of the water return bowl 3 caused by the elasticity of the water return bowl 3 and the gravitational force applied on the water return bowl 3. According to the water seal floor drain in the present disclosure, the closure surface of the bottom of the water return bowl 3 may achieve airtightness more effectively. Hypothetically, when a level of water stored in the small-sized water tank 2 is only one millimeter, the water is still present for airtightness. Therefore, in the structure in the present disclosure, the amount of water stored in the small-sized water tank 2 may be significantly reduced. When the requirement for the volume of the stored water is reduced, the height of the upper end of the wall of the water outlet 1 may be reduced. That is, a height of a "hurdle" for the water to flow over is reduced. In this way, resistance for draining water may be reduced significantly. This is what countless designers of the water-sealed floor drains have been aiming to achieve for 100 years—a water seal floor drain that achieves airtightness but does not have a bent path for water to flow over.

A gas energy cushioning apparatus is configured on the top of the water return bowl 3 by taking the elasticity of silicone. An air bag 7 may be configured at a center of the water return bowl 3, protruding outwardly and having a spherical surface. The air bag 7 may absorb the negative pressure generated by the sewer. When the negative pressure is generated, the spherical air bag 7 protruding outwardly may contract downwardly to absorb the energy, preventing the water stored in the small-sized water tank 2 from being absorbed into the sewer. An air bag 6 may be configured at an outer edge of the air bag 7, the air bag 6 may be ring-shaped and protruding downwardly. When the positive pressure is generated in the sewer, the airbag 6 that protrudes downwardly may be compressed, which absorbs the energy of the positive pressure, preventing the grate 5 from being collapsed. The air bag 7 and the air bag 6 may be connected smoothly to form a concave-convex portion, which has a "W"-shaped cross section. Thicknesses of the silicone of the air bag 7 and the air bag 6 may be relatively small to ensure sensitivity while the air bags are functioning. The "W"-shaped cross section may include a reversed "W" shape. That is, the air bag 7 in the center of the water return bowl 3 protrudes downwardly, whereas the air bag 6 at the outer edge of the air bag 7 protrudes upwardly. In this case, the functions of absorbing energies of the air bag 6 and the air bag 7 may be reversed. According to such the structure in the present disclosure, the edges of the water return bowl 3 having the flat top surface may have rounded corners for transition. The edge of the water return bowl 3 that has rounded corners on the top surface may facilitate the water to be drained from the edge of the grate 5.

Figure 2:
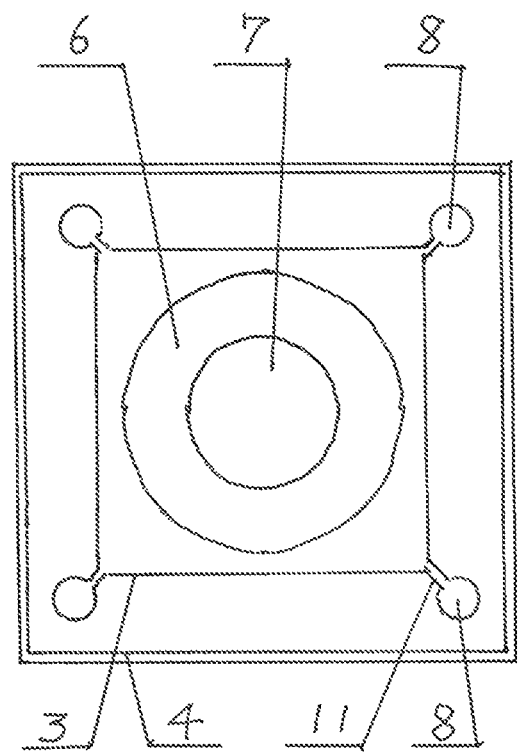
FIG. 2 is a schematic view of a post of the grate.

As shown in FIG. 2, four posts 10 may be configured to extend from the bottom plane of the water storage tank 4 to support the grate 5. Four positioning sleeves 8, each of which has a diameter matching with a diameter of each of the four posts 10, may be configured at four corners of the silicone water return bowl 3. In other words, the positioning sleeves 8 are configured to position the entire water return bowl 3 in the water storage tank 4 (or the small-sized water tank 2). The positioning sleeve 8 is connected to the upper end of the water return bowl 3 through a connection arm 11. This is an embodiment of configuring the posts 10 out of the water return bowl 3. There are two embodiments showing a position of the top surface of the water return bowl 3. In a first embodiment, the top surface of the water return bowl 3 may abut against the bottom plane of the grate 5 tightly. In this case, the connection arm 11 may be relatively short. In a second embodiment, the top surface of the water return bowl 3 may be spaced apart from the grate 5. In this case, while draining water, a water drainage pressure may be applied to the skirt of the water return bowl 3, and a component force may be generated upwardly to lift the water return bowl 3, allowing the water return bowl 3 to abut against the bottom of the grate tightly. At this stage, the height of the water outlet may be equal to a sum of a distance of the water return bowl 3 being lifted up and a height of the sheet of the skirt of the water return bowl 3 being opened. By adding up the distance and the height, the height of the water outlet may be increased, the resistance for draining the water may further be reduced to achieve draining water with no obstruction. After water drainage is terminated, the water return bowl 3 may be returned to its original position caused by the gravitational force applied to the water return bowl 3, such that the water return bowl 3 stands on the bottom plane of the small-sized water tank 2 again. According to such the structure, the height of the small-sized water tank 2 may be greater than the distance of the water return bowl 3 being lifted up. The water return bowl being lifted up and falling down may be achieved by the connection arm, which is elastic and has a sheet-like structure. In order to allow the connection arm 11 to have enough flexibility, the water return bowl 3 may be configured to be octagonal (a square having four corners cut off) to extend the length of the connection arm, such that the water return bowl 3 may be stretched by the connection arm 11. In this way, the water return bowl 3 may be flexibly lifted up or fall down by the gravitational force. There may be three embodiments of the top surface of the water return bowl 3 having such the structure. In a first embodiment, the top surface may be flat, and the flat top surface may be in a shape of a thin film. In a second embodiment, the top surface may be a curved thin film surface that slightly protrudes upwardly. In a third embodiment, the skirt at the upper portion of the water return bowl 3 may have a compressed folding portion. When the sewer generates the positive pressure, the box type water return bowl 3 may serve as a piston and may be lifted up by the positive pressure. The folding portion may be compressed to absorb energy (the thin film may also absorb the energy in this process). When the sewer generates the negative pressure, the thin film may be deformed by the negative pressure to protrude downwardly as the area of the top surface of the box type water return bowl 3 may be relatively large. The folding portion may be compressed to absorb the negative energy.

An edge of the air bag 6 and the air bag 7 (including a connective edge of the air bag 6 and the air bag 7) which has the "W"-shaped cross section may be circular, rectangular, octagonal, and the like.

Figure 3:
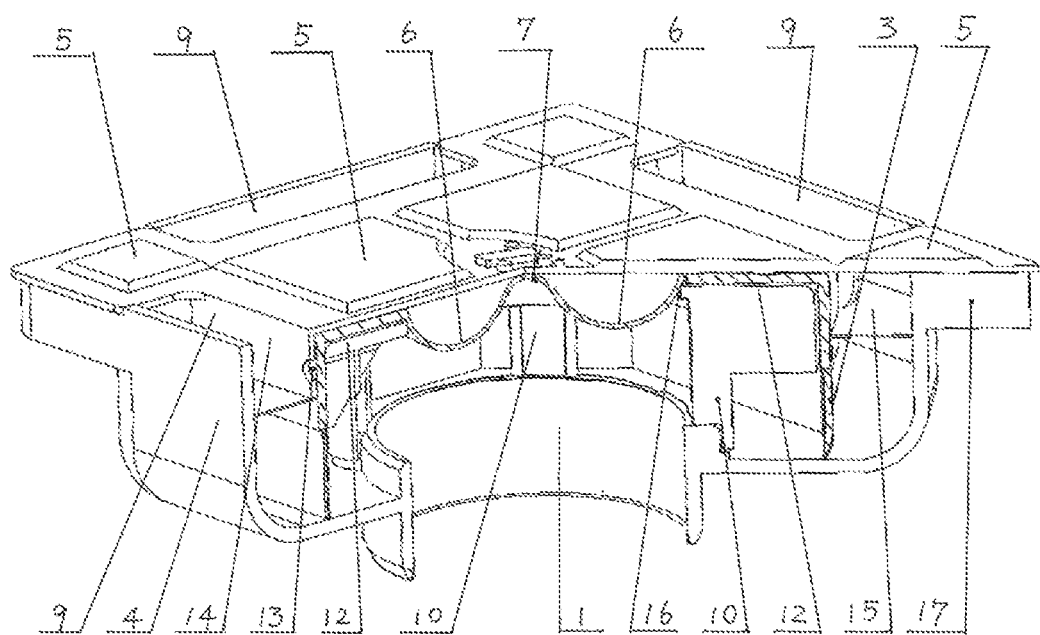
FIG. 3 is a schematic view of an octagonal floor drain.
In the drawings, water outlet 1, small-sized water tank 2, water return bowl 3, water storage tank 4, grate 5, a positive pressure air bag 6, a negative pressure air bag 7, positioning sleeve 8, water drainage hole 9, post 10, connection arm 11, water return bowl bracket 12, fixing hole 13, bent plate 14, check valve 15, large hole 16, support corner 17.

As shown in FIG. 3, FIG. 3 shows a water seal floor drain that takes only the water storage tank 4 to store the water directly.

A water return bowl bracket 12, which is made of plastics, may be configured in the water return bowl 3. The post 10 may be configured on a bottom surface of the water return bowl bracket 12. A reinforcement rib may be configured on a side surface of the post 10. Four posts 10 may extend downwardly to contact and support the top of the wall of the water outlet 1. A reinforcement stage may be configured at a supporting position of the wall of the outlet 1 corresponding to the post 10. In this structure, two or three posts may be configured. A large hole 16 may be defined in a top of the water return bowl bracket 12. The air bag 6 and the air bag 7 may be exposed from the large hole 16. A cross section of the water storage tank 4 may be octagonal. A top of the water storage tank 4 may be squared and have four support corners 17 protruding outwardly. The four support corners 17 may support four corners of the grate 5. Such the edge supporting structure that does not have the post 10 may be another embodiment. When the post 10 is not configured, the water return bowl bracket 12 may be omitted, and the silicone water return bowl 3 may be fixed to a bent plate 14 directly through a screw. The skirt of the water return bowl 3 and the water storage tank 4 may both be octagonal. A bottom edge of the sheet-like skirt of the water return bowl 3 may directly contact an inner bottom surface of the water storage tank 4 (a standing position). The bottom of the skirt of the water return bowl 3 may be a soft closure surface. The bottom plane of the water storage tank 4 may serve as a valve base. A thin sheet-like check valve 15 may be configured at a middle of the skirt of the water return bowl 3 and may extend towards a front along a plane. The check valve 15 may serve as a cover, surrounding the skirt of the water return bowl 3. A front of the octagonal check valve 15 may engage with an octagonal inner wall of the water storage tank 4. That is, the inner wall of the water storage tank 4 may serve as the valve base. A height level of the check valve 15 may be higher the level of the water stored in the water storage tank 4. In this way, the water stored in the water storage tank 4 may be isolated from the indoor environment, such that the water stored in the water storage tank may not be evaporated. When water is not present in the water storage tank 4, the check valve 15 may serve as a mechanical valve to seal the water drain. When water flows through, the thin sheet-like check valve 15 may be bent downwardly by the gravitational force of the water. After the water flows through, the check valve 15 may return to its original shape due to the elasticity of the silicone. The front of the check valve 15 may abut against the wall of the water storage tank 4 again for sealing. The grate 5 may be a stainless steel plate formed by stamping. A concave-convex reinforcement rib may be configured on the grate 5. The water drainage hole 9 may be defined in the four edges of the grate 5. While stamping to define the water drainage hole 9, the material being stamped may be bent downwardly for 90 degrees to form the bent plate 14. The bent plate 14 may be a reinforcement rib and may also be a connection apparatus between the grate 5 and the water return bowl 3. A fixing hole 13 may be defined in the bent plate 14. The water return bowl 3 may be tightly abut against the bottom surface of the grate 5 through a self-tapping screw.

What is claimed is:

1. A floor drain, wherein the floor drain comprising a water outlet, a small-sized water tank, a water return bowl, a water storage tank, a grate and a water drainage hole;
   wherein the water outlet is defined in a center of the water storage tank, an upper end of a wall of the water outlet protrudes from a bottom surface of the water storage tank, a lower end of the wall of the water outlet protrudes from the water storage tank to serve as a pipe joint;
   the water return bowl is box shaped and is made of silicone;
   a bottom of a skirt of the water return bowl directly contacts the bottom surface of the water storage tank to form a closure surface;
   a top surface of the water return bowl abuts against the grate;
   the skirt of the water return bowl is sheet shaped, and the skirt of the water return bowl being bent inwardly under a pressure generated while draining water; and
   a water drainage hole of the grate is defined in an edge of the water storage tank;
   the bottom surface of the water storage tank is raised outwardly of the skirt of the water return bowl to form an inner wall having an upper end level with the upper end of the wall of the water outlet;
   a space of the water storage tank for storing water is reduced to be the small-sized water tank;
   the bottom of the skirt of the water return bowl directly contacts the bottom surface of the small-sized water tank to form the closure surface; and
   an outer edge of the bottom of the skirt of the water return bowl contacts the inner wall forming a value-like closure surface.

2. The floor drain according to claim 1, wherein a post is configured in the water storage tank for supporting the grate.

3. The floor drain according to claim 1, wherein a first air bag and an second air bag are configured on a top surface of the water return bowl that has a flat top surface, and a cross section of the first air bag and the second air bag is "W" shaped.

4. The floor drain according to any one of claim 1, wherein a top of the water return bowl is thin film-shaped.

* * * * *